United States Patent [19]
Ervin

[11] 3,943,301
[45] Mar. 9, 1976

[54] SOLID STATE FOUR-WIRE SWITCH FOR KEY TELEPHONES

[76] Inventor: John W. Ervin, P.O. Box 123, Kearney, Mo. 64060

[22] Filed: Oct. 7, 1974

[21] Appl. No.: 512,437

[52] U.S. Cl................ 179/99; 179/1 SW; 179/81 R
[51] Int. Cl.².......................................... H04M 1/00
[58] Field of Search....... 179/81 R, 90 K, 99, 1 SW, 179/18 AF, 158, 160, 170 R, 170 D, 170 T

[56] References Cited
UNITED STATES PATENTS

| | | | |
|---|---|---|---|
| 2,810,081 | 10/1957 | Elliott............................ | 179/170 T |
| 3,366,746 | 1/1968 | Gracia et al. ................... | 179/81 R |
| 3,372,236 | 3/1968 | Schwartz......................... | 179/1 SW |
| 3,519,765 | 7/1970 | Huber ............................. | 179/170 T |

*Primary Examiner*—Kathleen H. Claffy
*Assistant Examiner*—Randall P. Myers
*Attorney, Agent, or Firm*—Lowe, Kokjer, Kircher, Wharton & Bowman

[57] ABSTRACT

A compact, solid state four-wire switch for use with key telephones. The switch comprises a pair of transistors which, in the two-wire mode, electrically connect a telephone receiver with a telephone circuit balance network. In the four-wire mode a negative potential derived from the four-wire station pickup relay turns off the switch by reverse biasing the switch transistors to thereby electrically isolate the receiver from the balance network. The transistors are encapsulated within a thin, generally rectangular housing module which is adapted to be mounted interiorly of a key telephone on any of the pre-punched mounting holes therein. Electrical connection with the telephone circuitry is facilitated by three screw down terminals mounted on the module and three module leads equipped with terminal connectors.

8 Claims, 5 Drawing Figures

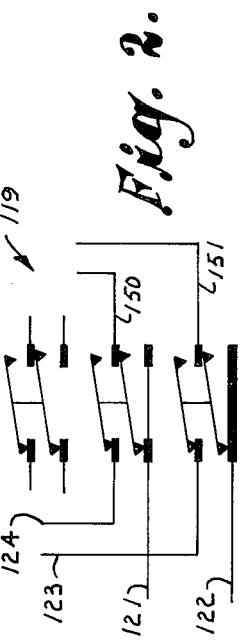
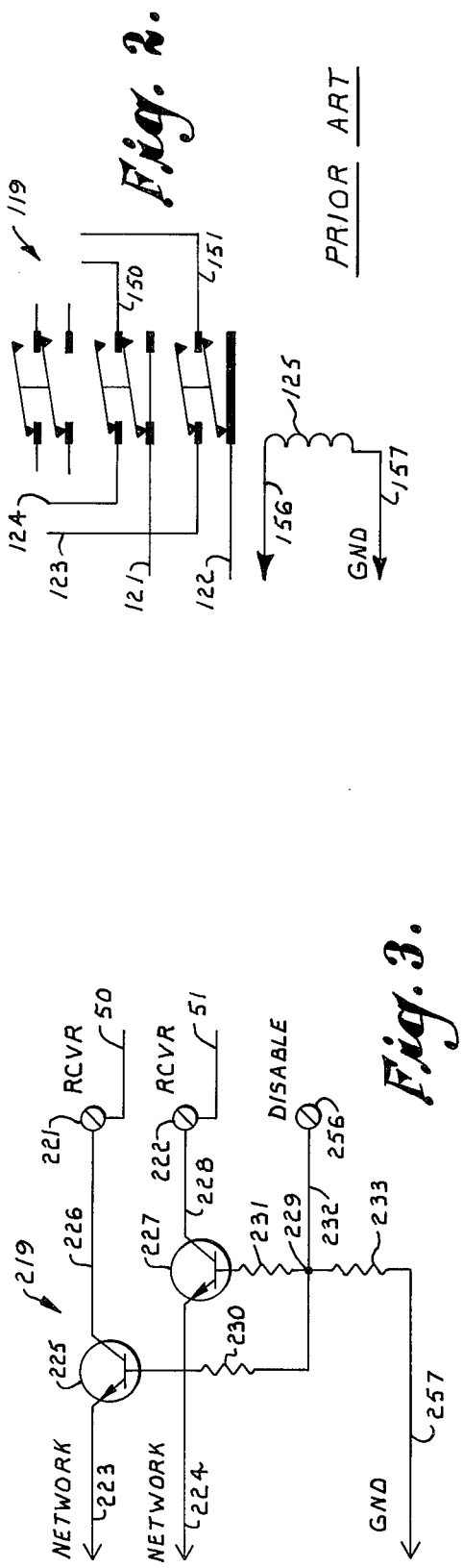
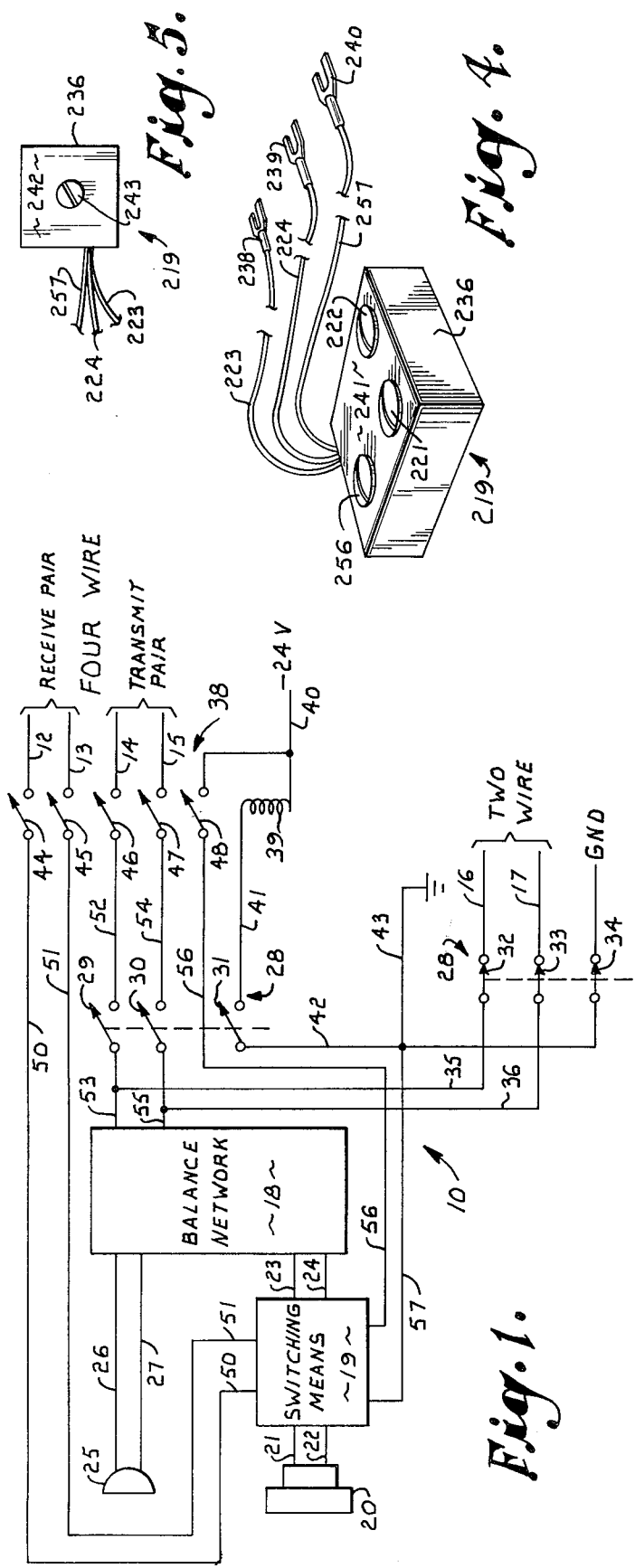

SOLID STATE FOUR-WIRE SWITCH FOR KEY TELEPHONES

BACKGROUND AND SUMMARY

This invention relates to telephones. More particularly the invention relates to a solid state switch for key telephones which is adapted for either two-wire or four-wire operation.

In a typical two-wire telephone circuit both transmitted and received information is propagated on a single pair of conductors. A balance network is utilized for impedance matching and predetermined mixing of the speech generated by the transmitter with the incoming signal being delivered to the receiver. A conventional electromechanical switching relay is employed by prior art devices to couple the receiver with the balance network for mixing in the two-wire mode.

In four-wire telephone systems separate pairs of conductors are utilized for transmitting and receiving information. Four-wire operation is particularly advantageous in long distance circuits where repeaters and line amplifiers are necessary, because, for example, operating stability of such equipment is enhanced by processing information in single directions only. In four-wire systems mixing of received and transmitted information may be necessary. When required the mixing is performed at the telephone company central office, instead of utilizing the local balance network as in two-wire systems. Accordingly, the aforementioned switching relay is utilized in the four-wire mode to isolate the receiver from the balance network, and to connect it instead to the four-wire receive pair of conductors.

The prior art four-wire switching relays are undesirable in several respects. Due to their physical size, such prior art electromechanical relays are difficult to install in telephone instruments, requiring a plurality of mounting holes and considerable space. Relay connecting wires must either be spliced to the appropriate telephone wires or tied down on spare terminal board punchings. Splices are time consuming and bulky. The use of spare punchings requires a large number of design drawings to cover different telephone types. The complexity of such relays contributes significantly to their expense. Finally, since they are actuated by an electric coil, energy is unnecessarily wasted.

It is thus a fundamental object of this invention to provide a solid state replacement for the aforementioned electromechanical switching relay.

Another object is to provide a solid state relay of the character described which is compatible with either two-wire or four-wire operation.

Another object of this invention is to minimize the amount of energy consumed during four-wire operation.

A still further object of this invention is to provide a switching relay having the aforementioned characteristics which may be quickly and easily installed in a conventional telephone.

The present invention comprises a compact, solid state switch which is designed to replace the aforementioned electromechanical switching relay. The switch comprises a pair of transistors which, in the two-wire mode, electrically connect a telephone receiver with the telephone unit balance network. In the four-wire mode the transistors are biased off by a negative potential derived from the four-wire station pickup relay, so that the switch thus isolates the receiver from the telephone balance network. The circuit elements are housed within a compact, generally cubicle plastic module which is adapted to be attached to a perforated mounting surface within the telephone unit. A single mounting screw is provided on the module for the latter purpose. Installation of the module requires no splices and uses no spare telephone punchings. All connections to the telephone circuitry are made either with spade tipped module leads or via screw down terminals located on the module itself.

Other and further objects of this invention will become apparent in the course of the following description.

DETAILED DESCRIPTION

In the accompanying drawings, which form a part of the specification and are to be read in conjunction therewith, and in which like reference numerals indicate like parts in the various views:

FIG. 1 is a simplified block diagram of a conventional four-wire telephone system in which the instant invention may be advantageously utilized;

FIG. 2 is a schematic view of a prior art four-wire switching relay which the subject invention was designed to replace;

FIG. 3 is a schematic diagram of a solid state, four-wire switch constructed in accordance with the teachings of this invention;

FIG. 4 is a perspective view of the switch; and

FIG. 5 is a bottom plan view of the switch.

With initial reference to FIG. 1, reference numeral 10 generally designates a four-wire key telephone system in which the subject invention may be advantageously employed. In four-wire operation a separate receive pair of conductors 12 and 13 carry incoming information and a separate transmit pair of conductors 14 and 15 carry transmitted signals. In two-wire operation, on the other hand, a single pair of conductors 16 and 17 carry both received and transmitted signals. Conductors 12–15, 16 and 17 lead to the telephone company central office (not shown). In two-wire operation mixing of incoming signals (received information) with outgoing signals (transmitted information) takes place in a balance network 18. For the latter purpose a switching means 19 is utilized to selectively couple the telephone receiver 20 with the balance network 18. Lines 21 and 22 connect receiver 20 to switching means 19, which is in turn connected to the balance network by lines 23 and 24. Transmitter 25 is connected to the balance network by lines 26 and 27. In the four-wire mode mixing takes place at the telephone company's central office, rather than in the telephone balance network.

A manually operable key switch 28, which comprises a plurality of individual switch elements 29–34, determines whether a two or four-wire mode is selected. Switch 28 is illustrated in the two-wire mode in which switch elements 32 and 33 respectively couple lines 16 and 17 (the two-wire pair) to lines 35 and 36 which lead to balance network 18. During two-wire operation switching means 19 will couple receiver 20 to balance network 18 on lines 23 and 24.

In four-wire operation switch elements 29–31 will be closed and switch elements 32–34 will be open. Closure of switch element 31 will activate a line switch 38 by actuating relay coil 39. Current will flow to ground through coil 39 and switch element 31 via lines 40, 41, 42 and 43. At this time switch elements 44–48 (which comprise switch 38) will be closed so that the receive pair 12 and 13 will be connected to switching means 19 by lines 50 and 51 respectively, and transmit pair 14 and 15 will be connected to balance network 18 by lines 52–53 and 54–55 respectively. Switch element 48 will deliver a negative potential (−24v.) to line 56 from line 40. In response to the negative potential on line 56 switching means 19 will isolate the receiver 20 from the balance network 18. Line 57 connects switch 19 with ground via line 43.

In the prior art, switching means 19 is typically comprised of a four-wire relay 119, which is illustrated in the four-wire position in FIG. 2. When relay 119 is installed, receiver 20 is connected thereto via lines 121 and 122, balance network 18 is connected thereto via lines 123 and 124, and the receiver pair 12 and 13 are interconnected to the relay (through switch elements 44 and 45) by lines 150 and 151. Relay 119 is switched into the four-wire position by relay coil 125, which receives a negative voltage (−24v.) via line 156. One end of coil 125 is grounded via line 157. Switch contact 48 delivers the latter voltage potential to line 156 from line 40. In the four-wire mode the relay 119 connects receiver lines 121 and 122 with lines 150 and 151 respectively. Lines 121 and 122 are respectively isolated from balance network lines 123 and 124 during this time. In the two-wire mode however, lines 121 and 122 are respectively coupled to lines 123 and 124 so that receiver 20 communicates with balance network 18. Lines 121–124, 150, 151, 156 and 157 in FIG. 2 respectively correspond to lines 21–24, 50, 51, 56 and 57 in FIG. 1.

The preferred embodiment of a solid state four-wire switch which is constructed in accordance with the teachings of this invention is shown in FIG. 3. Switch 219 is designed to replace the prior art switching relay 119 (FIG. 2). A first network line 223 is connected to the emitter electrode of a first NPN transistor 225. The collector electrode of transistor 225 leads to a first receiver terminal 221 via a line 226. A second network line 224 leads to the emitter electrode of a second NPN transistor 227. The collector electrode of transistor 227 is electrically connected to a second receiver terminal 222 via a line 228. In the preferred embodiment transistors 225 and 227 comprise a dual transistor package.

The base electrodes of transistors 225 and 227 are connected to a reverse biasing node 229 by resistors 230 and 231 respectively. Node 229 is connected to a disable terminal 256 via a line 232 and to a ground line 257 via a resistor 233. When an appropriate negative voltage is applied to terminal 256 (and thus to node 229 via line 232), the transistors 225 and 227 will be biased off via the respective base resistors 230 and 231. In FIG. 3 reference numerals 221–224, 256, and 257 respectively correspond generally to reference numerals 21–24, 56, and 57 in FIG. 1.

In the two-wire mode both transistors are "on". Balance network lines 23 and 24 (FIG. 1) are electrically negative with respect to ground, so that when switch 219 is installed, transistors 225 and 227 will be turned on by the flow of current to ground through the transistor emitter-base junctions, resistors 230 or 231 respectively, resistor 233 and line 257. Thus, in the two-wire mode, the switched on transistors will electrically connect terminals 221 and 222 with network lines 223 and 224 respectively, so that receiver 20 (which is electrically connected to the receiver terminals 221 and 222) will be electrically connected to the balance network 18. When switch 219 is installed lines 50 and 51 (FIGS. 1 and 3) are electrically connected directly to terminals 221 and 222 respectively. The receive pair 12 and 13 nevertheless remain isolated from balance network 18 in the two-wire mode because switch contacts 44 and 45 are open at this time.

In the four-wire mode transistors 225 and 227 are biased off by the application of a negative potential (−24v.) to disable terminal 256, which communicates with the transistor base electrodes via line 232, node 229 and resistors 230 and 231 respectively. As discussed in conjunction with FIG. 1, this potential will be transmitted from line 40 to line 56 (and thus terminal 256) by the closing of switch contact 48. When the transistors are "off", network lines 223 and 224 will be electrically isolated from receiver terminals 221 and 222 respectively. Thus in the four-wire mode the receiver 20 is electrically isolated from balance network 18 by the switch 219. Since receiver 20 and lines 50 and 51 are electrically connected to terminals 221 and 222, the receiver 20 will be connected to receive pair 12 and 13 in the four-wire mode by the closing of switch contacts 44 and 45 respectively.

The electronic components of switch 219 are housed within a housing module 236 (FIGS. 4 and 5). In the preferred embodiment the housing 236 is of plastic or the like and the transistor and resistor switch elements are encapsulated or sealed by epoxy resin or similar substances therewithin. Each of the lead lines 223, 224 and 257 extend outwardly from the module and are terminated with suitable terminal connectors 238–240 respectively for connection to appropriate terminal boards within the telephone circuit. Screw down terminals 221, 222, and 256, which are adapted to receive appropriate conductors within the telephone, are located on the upper surface 241 of the housing 236. As seen in FIG. 5, the underside 242 of switch housing 236 is provided with a mounting screw 243 which facilitates mechanical mounting of the module to a perforated surface.

To install the switch 219, if the relay 119 is removed, and each of the lines extending from the relay disconnected from the appropriate terminal board within the telephone unit. Switch 219 is then securely fastened to the perforated mounting surface within the telephone by screw 243. Lines 223, 224, and 257 are connected to appropriate terminals to provide electrical connection with lines 23, 24 and 57 respectively. Lines 50 and 21 are attached to switch terminal 221, and lines 51 and 22 are similarly attached to terminal 222. The switch will now function normally in the two-wire mode. When four-wire operation is desired, line 56 must be connected to terminal 256.

From the foregoing it will be seen that this invention is now well adapted to attain all the ends and object hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A solid state switch for switching between a two-wire operating mode and a four-wire operating mode in a telephone, said telephone including a two-wire circuit comprising a pair of conductor lines connected with a telephone balance network for operation in the two-wire mode and a four-wire circuit having a pair of receiver lines bypassing the balance network for operation in the four-wire mode, the switch comprising:

first and second network lines adapted to be electrically connected to the telephone balance network;
first and second receiver terminals adapted to be electrically connected to a telephone receiver;
solid state switching means for electrically connecting said first network line to said first receiver terminal and said second network line to said second receiver terminal in the two-wire mode, said switching means having means for electrically coupling said first and second receiver terminals with the respective four-wire receiver lines, said switching means comprising a pair of transistors each having base, emitter, and collector electrodes, said base electrodes resistively coupled to ground, said emitter electrodes connected to the respective network lines, and said collector electrodes connected to the respective receiver terminals; and
reverse biasing means for turning off said switching means in a four-wire mode to thereby electrically isolate said network lines from said receiver terminals while electrically coupling said four-wire receiver lines with said receiver terminals.

2. The combination as in claim 1, wherein
said reverse biasing means comprises means interconnected with said transistor base electrodes for turning off said transistors in response to an externally supplied voltage.

3. The combination as in claim 2, including means for housing said switching means, said housing means being adapted to be attached to a perforated mounting surface.

4. The combination as in claim 3, wherein
said transistors are encapsulated within said housing means.

5. The combination as in claim 1, wherein
said switching means comprises:
a first transistor having a base electrode, an emitter electrode connected to said first network line, and a collector electrode connected to said first receiver terminal;
a reverse biasing node;
a first resistor for connecting said first transistor base electrode to said reverse biasing node;
a second transistor having a base electrode, an emitter electrode connected to said second network line, and a collector electrode connected to said second receiver terminal;
a second resistor for connecting said second transistor base electrode to said reverse biasing node; and
a third resistor for connecting said reverse biasing node to ground.

6. The combination as in claim 5, wherein
said reverse biasing means comprises:
a disable terminal adapted to be connected with a source of voltage; and
means for connecting said disable terminal with said reverse biasing node.

7. The combination as in claim 6, including means for housing said switching means, said housing means being adapted to be attached to a perforated mounting surface.

8. The combination as in claim 7, wherein said first and second transistors and said first, second, and third resistors are encapsulated within said housing means.

* * * * *